(12) United States Patent
Nobbe et al.

(10) Patent No.: US 12,242,610 B2
(45) Date of Patent: Mar. 4, 2025

(54) MITIGATION OF A MANIPULATION OF SOFTWARE OF A VEHICLE

(71) Applicant: Robert Bosch GmbH, Stuttgart (DE)

(72) Inventors: Carsten Nobbe, Remchingen (DE);
Felix Hallaczek, Stuttgart (DE);
Joachim Graf, Gueglingen (DE);
Manuel Jauss, Wissgoldingen (DE);
Marcel Kneib, Ingelheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 206 days.

(21) Appl. No.: 18/169,039

(22) Filed: Feb. 14, 2023

(65) Prior Publication Data
US 2023/0267213 A1 Aug. 24, 2023

(30) Foreign Application Priority Data
Feb. 23, 2022 (DE) .................... 10 2022 201 898.2

(51) Int. Cl.
*G06F 7/04* (2006.01)
*G06F 21/57* (2013.01)

(52) U.S. Cl.
CPC ........ *G06F 21/57* (2013.01); *G06F 2221/033* (2013.01)

(58) Field of Classification Search
CPC ........ G06F 21/55; G06F 21/57; G06F 21/566; G06F 2221/033
See application file for complete search history.

(56) References Cited

U.S. PATENT DOCUMENTS

| 2003/0065968 A1* | 4/2003 | Schneider | G06F 21/57 714/1 |
| 2009/0125985 A1* | 5/2009 | Traenkenschuh | G06F 21/51 726/4 |

(Continued)

OTHER PUBLICATIONS

Hamad et al, A Framework for Policy Based Secure Intra Vehicle Communication, IEEE, Nov. 29, 2017, pp. 1-8. (Year: 2017).*

(Continued)

*Primary Examiner* — Philip J Chea
*Assistant Examiner* — Jenise E Jackson
(74) *Attorney, Agent, or Firm* — NORTON ROSE FULBRIGHT US LLP; Gerard A. Messina (57) ABSTRACT

A computer-implemented method. The method includes recognizing the possibility of a manipulation of the software of a first component of a plurality of components of a vehicle electrical system of a vehicle in a central device for mitigating a manipulation of software. The central device for mitigating a manipulation is part of the vehicle electrical system, and is designed to mitigate a manipulation of software in each component of the plurality of components of the vehicle electrical system. The method further includes initiating a countermeasure for mitigating the manipulation of the software of the first component and carrying out the countermeasure for mitigating the manipulation of the software of the first component. The countermeasure includes changing a functionality of the first component and at least partially shifting the functionality of the first component to one or multiple other components of the plurality of components.

11 Claims, 5 Drawing Sheets

(56) References Cited

U.S. PATENT DOCUMENTS

2018/0239917 A1\*   8/2018   Takano .................... H04L 9/10
2019/0294799 A1\*   9/2019   Kumar ................... G06F 21/81
2020/0213287 A1\*   7/2020   Zhang .................. H04L 63/123

OTHER PUBLICATIONS

Zhang et al., Examining Autonomous Vehicle Operating Systems Vulnerabilities Using a Cyber Physical Approach, IEEE, Sep. 22, 2021, pp. 976-981. (Year: 2021).\*

\* cited by examiner

MITIGATION OF A MANIPULATION OF SOFTWARE OF A VEHICLE

CROSS REFERENCE

The present application claims the benefit under 35 U.S.C. § 119 of German Patent Application No. DE 10 2022 201 898.2 filed on Feb. 23, 2022, which is expressly incorporated herein by reference in its entirety.

BACKGROUND INFORMATION

In recent times, vehicles are being increasingly integrated into open contexts (i.e., the vehicles include one or multiple interfaces via which data are received and/or sent during operation and in turn used for operating the vehicle). In addition, the complexity of the components of the vehicles, and in particular their software, is continually increasing. Furthermore, the software of the vehicles is updated in increasingly diversified ways during operation.

As a result, there are more possibilities for the manipulation of the software of the components of the vehicles.

In some methods of the related art, the detection and in particular the mitigation (i.e., remedying, so that a defined (secure) state is achieved) of manipulations are associated with significant complexity and thus, time delays. For example, during a visit to a repair shop the manipulated software of a component (a control unit, for example) may be reset and the manipulation may thus be remedied. In other techniques, software from a remote computer system may be requested, with the aid of which the manipulated software of a component (a control unit, for example) is reset and the manipulation is thus remedied. In both cases, there may be a significant period of time between detecting the manipulation and mitigating the manipulation. During this time period, the operation of the vehicle may be disrupted (for example, a predetermined safety criterion is no longer met). In some cases, the vehicle may no longer be roadworthy, or its functionality may be greatly impaired. Therefore, improved techniques for mitigating the manipulation of software are desirable.

SUMMARY

A first general aspect of the present invention relates to a computer-implemented method. According to an example embodiment of the present invention, the method includes recognizing the possibility of a manipulation of the software of a first component of a plurality of components of a vehicle electrical system of a vehicle in a central device for mitigating a manipulation of software. The central device for mitigating a manipulation is part of the vehicle electrical system, and is designed to mitigate a manipulation of software in each component of the plurality of components of the vehicle electrical system. The method further includes initiating a countermeasure for mitigating the manipulation of the software of the first component and carrying out the countermeasure for mitigating the manipulation of the software of the first component. The countermeasure includes changing a functionality of the first component and at least partially shifting the functionality of the first component to one or multiple other components of the plurality of components. The vehicle electrical system is designed to carry out the changing of the functionality and the at least partial shifting, likewise in the event of violation of one or multiple operating state-related criteria of the first component and/or of the vehicle.

A second general aspect of the present invention relates to a system that is designed to carry out the method according to the first general aspect of the present invention.

A third general aspect of the present invention relates to a vehicle electrical system for a vehicle. The vehicle electrical system includes a plurality of components that involve a first component and a central device for mitigating a manipulation of software. The vehicle electrical system is designed to carry out the method according to the first general aspect of the present invention.

A fourth general aspect of the present invention relates to a vehicle that includes the system according to the second general aspect and/or is a part of same, and/or includes the vehicle electrical system according to the third general aspect of the present invention.

The techniques of the first through fourth general aspects of the present disclosure may in some cases have one or more of the following advantages.

Firstly, by changing the functionality of the first component and shifting the functionality of the first component to one or multiple other components of the plurality of components, in some situations it may be ensured that a certain functionality of the vehicle is provided even after the manipulation, and/or a renewed attack on the first component does not impair the functionality. Thus, for example, a first component may provide a braking functionality of the vehicle (and may access a corresponding actuator, for example in the form of a brake booster). By manipulating the first component, an intruder may attempt to bring about overbraking of the vehicle. The techniques of the present disclosure may now ensure that after the manipulation is recognized, the first component is not used, or is used only to a limited extent, for providing the braking functionality (i.e., the functionality of the first component is changed). In this way, the attack may be prevented from misusing the first component in the intended manner. In addition, a further component may (at least partially) provide the braking functionality in the vehicle (i.e., the braking functionality is at least partially shifted to the further component, for example an ESC unit). The vehicle may thus have a braking functionality (according to a requirement profile), even after manipulation of the software. In addition, the shifting of the functionality may in some cases prevent an intruder from re-attacking the braking functionality of the vehicle by manipulating the software of the first component.

Secondly (and as a result of the first advantage), measures which are carried out in the event of the violation of one or multiple operating state-related criteria of the first component and/or of the vehicle, and which for this purpose are already implemented in the vehicle, may be "reused." In some cases, the techniques of the present disclosure may thus be implemented with relatively little complexity. In the above example, shifting of a braking functionality may already be provided for a case in which braking of the vehicle by the first component (a brake booster, for example) is not possible. For example, a defect of a brake booster may be present. This operating state may be detected in the vehicle, and the braking functionality may be shifted to a further component (an ESC unit, for example). The techniques of the present disclosure may now use this already present measure, even if a manipulation of the software is detected. A complicated implementation of the shift mechanism may therefore be dispensed with in some situations.

Several terms are used as follows in the present disclosure:

In the present disclosure, a "component" (of a vehicle electrical system) includes its own hardware resources, which include at least one processor for executing commands, and memory for storing at least one software component. The term "processor" also encompasses multicore processors or multiple separate elements that take over the tasks of a central processing unit of an electronic device (and optionally share same). A component may carry out tasks independently (for example, measuring tasks, monitoring tasks, control tasks, communication tasks, and/or other work tasks). However, in some examples, a component may also be controlled by another component. A component may be physically delimited (with its own housing, for example) or may be integrated into a higher-order system. A component may be a control unit or a communication device of the vehicle. A component may be an embedded system. A component may include one or multiple microcontrollers.

An "embedded system" is a component that is integrated (embedded) into/in a technical context. In the process, the component takes over measuring tasks, monitoring tasks, control tasks, communication tasks, and/or other work tasks.

A "(dedicated) control unit" is a component that (exclusively) controls a function of a vehicle. A control unit may take over, for example, an engine control, a control of a braking system, or a control of an assistance system. A "function" may be defined on various levels of the vehicle (for example, an individual sensor or actuator, or also a plurality of assemblies that are combined to form a larger functional unit, may be used for a function).

The term "software" or "software component" may in principle be any part of software of a component (a control unit, for example) of the present disclosure. In particular, a software component may be a firmware component of a component of the present disclosure. "Firmware" is software that is embedded in (electronic) components, where it performs basic functions. Firmware is functionally fixedly connected to the particular hardware of the component (so that one is not usable without the other). Firmware may be stored in a nonvolatile memory such as a flash memory or an EEPROM.

The term "update information" or "software update information" encompasses any data which, directly or after appropriate processing steps, form a software component of a component according to the present disclosure. The update information may contain executable code or code yet to be compiled (which is stored in the memory of the component in question).

In the present disclosure, the term "manipulation" encompasses any change in software of a component of a vehicle. The change may be the consequence of an attack (i.e., the deliberate influence by a third party), or also the consequence of a random or inadvertent action.

The term "vehicle" encompasses any device that transports passengers and/or cargo. A vehicle may be a motor vehicle (a passenger car or a truck, for example), or also a rail vehicle. However, floating and flying devices may also be vehicles. Vehicles may be operated or assisted at least semi-autonomously.

A "vehicle electrical system" may be any internal network of a vehicle via which components of the vehicle communicate. In some examples, a vehicle electrical system is a local area network. A vehicle electrical system may use one or multiple local area communication protocols (for example, two or more local area communication protocols). The local area communication protocols may be wireless or wired communication protocols. The local area communication protocols may include a bus protocol (CAN, LIN, MOST, FlexRay, or Ethernet, for example). The local area communication protocols may include a Bluetooth protocol (for example, Bluetooth 5 or later) or a WLAN protocol (for example, a protocol of the IEEE-802.11 family, for example 802.11h or a later protocol). A vehicle electrical system may contain interfaces for communicating with systems outside the vehicle, and may thus also be integrated into other networks. However, the systems outside the vehicle and the other networks are not part of the vehicle electrical system.

The expression "recognizing a possibility . . . " means that certain occurrences (for example, signals or the absence thereof) are interpreted according to predetermined rules in order to recognize a state in which a manipulation of the software may be present.

In the present disclosure, a "functionality" is any capability of the components to meet a certain task in the vehicle. For example, the task may be the operation of one or multiple systems of the vehicle (for example, engine, transmission, assistance systems, sensors, air conditioning, infotainment, communication interfaces, etc.). In other examples or in addition, the task may be carrying out a driving maneuver (or a portion of a driving maneuver), and may be carried out autonomously or with assistance (which may have various levels of complexity, for example braking maneuvers, steering maneuvers, driving along certain routes, or parking). In yet other examples, the task may be providing data (sensor data, for example), which in turn may be used for other tasks.

An "operating state" encompasses any state information regarding the vehicle and/or its components and/or the surroundings of the vehicle. An operating state may be defined by one or multiple state parameters of the vehicle and/or of its components and/or of its surroundings. The state parameters may be measured or computed parameters of the vehicle and/or of its components, and/or values derived therefrom (for example, a temperature of a component or a derived value that indicates a state of the vehicle and/or of its components). An operating state may be ascertained by monitoring the vehicle and/or its components (for example, it may be monitored whether the vehicle and/or its components behave(s) according to a certain specification).

DETAILED DESCRIPTION OF EXAMPLE EMBODIMENTS

A vehicle and a component in which the techniques of the present disclosure may be carried out, and the basic aspects of the techniques of the present disclosure, are initially discussed with reference to FIGS. 1 through 3. One example of the technique of the present disclosure is discussed with reference to FIG. 4. Further aspects of the central device for mitigating a manipulation of software are explained with reference to FIGS. 5 and 6.

Figure 1:
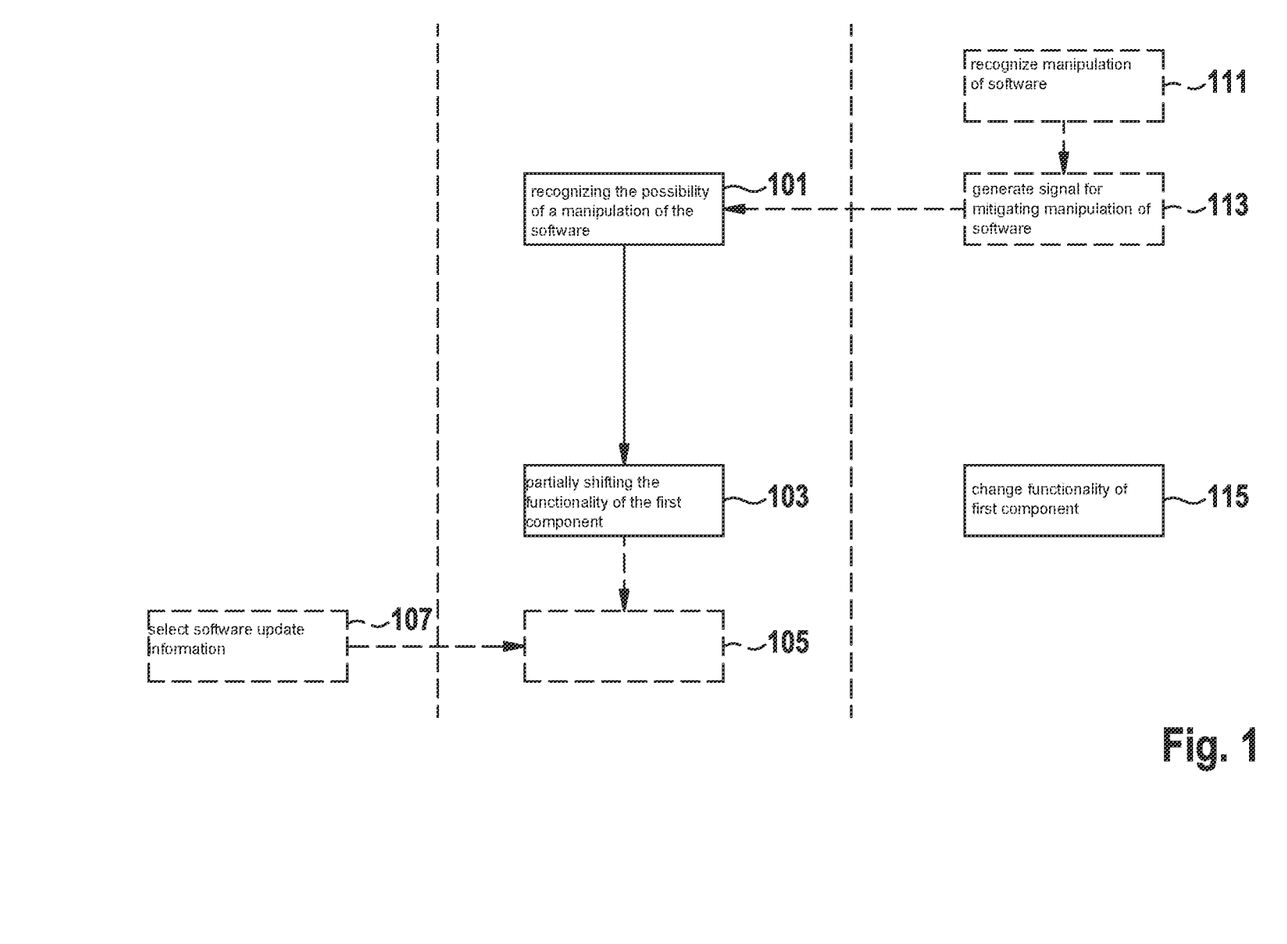
FIG. 1 is a flowchart illustrating example techniques of the present invention.

FIG. 1 is a flowchart illustrating the techniques of the present disclosure. FIG. 2 shows components of a vehicle electrical system of a vehicle in which the techniques of the present disclosure may be used. FIG. 3 shows an example of a component of a vehicle electrical system.

The middle column in FIG. 1 shows steps which in some examples may be carried out by a central device (or in other examples, also by other components) for mitigating a manipulation of software. The right column shows steps that are carried out by a certain component (or a group of components) of the vehicle electrical system (excluding the central device for mitigating a manipulation of software). The left column shows steps that are carried out by a remote system (i.e., outside the vehicle).

The techniques of the present disclosure include recognizing 101 the possibility of a manipulation of the software of a first component 27c of a plurality of components of a vehicle electrical system of a vehicle 20. FIG. 2 schematically shows a vehicle 20, and FIG. 3 shows an example of first component 27c. Vehicle 20 is equipped with a vehicle electrical system that connects a plurality of components 21 through 24, 25, 27a through f of vehicle 20 (the vehicle electrical system may be designed as described above).

Vehicle 20 includes a central device 25 for mitigating a manipulation of software, and which recognizes the possibility of the manipulation. The central device is thus part of the vehicle electrical system (i.e., is also part of the vehicle and moves along with it). Central device 25 for mitigating a manipulation of software may be designed to mitigate the manipulation of software in each of the plurality 21 through 24, 27a through f of components of the vehicle electrical system.

In some examples, central device 25 for mitigating a manipulation of software is integrated into a central communication interface of vehicle 20. The central communication interface may be designed to function as a data distributor for the communication within vehicle 20 and/or communication with the outside world via a communication interface 21, 22. The central communication interface may support different communication protocols (for communication in the vehicle electrical system or communication with external systems) and/or may implement safety functions. In other examples, the central device for mitigating a manipulation of software may be integrated into other components (further examples are discussed below) or may be designed as an independent component.

In some examples, the recognition may include the reception of a signal that indicates a manipulation of the software of a first component 27c of a plurality of components of a vehicle electrical system of a vehicle 20. The signal may be generated in central device 25 itself for mitigating a manipulation of software and/or in some other device.

Additionally or alternatively, the recognition may include the recognition of an absence of an (expected) signal (for example, by the first component or a component that monitors the first component). The vehicle electrical system may be designed for the plurality of components 21 through 24, 25, 27a through f or other components to send signals that indicate that no manipulation of the software of the particular component of the plurality of components 21 through 24, 25, 27a through f is present (for example, regularly or upon occurrence of certain events such as start-up of a component).

Additionally or alternatively, the recognition may also include processing of other state information of the vehicle electrical system in order to recognize the possibility of a manipulation of the software of the first component.

In response to recognizing the possibility of a manipulation of the software of first component 27c of a plurality of components of a vehicle electrical system of a vehicle 20 (for example, the reception of a signal or the recognition of the absence of a signal), a countermeasure for mitigating the manipulation of the first component is initiated and carried out.

The countermeasure includes changing 115 a functionality of first component 27c and at least partially shifting 103 the functionality of first component 27c to one or multiple other components of the plurality of components 27a, b, d through f.

In some examples, changing 115 the functionality of first component 27c may include switching off the functionality of first component 27c. This means that first component 27c no longer provides the functionality. First component 27c may be deactivated and/or blocked for this purpose.

In other examples, changing 115 the functionality may include limiting the functionality of first component 27c. For example, first component 27c may be designed to provide a certain functionality in multiple qualitative or quantitative stages (for example, with predetermined qualitative or quantitative features, alone or only in combination with further components, in various operating situations, etc.). A limitation may include switching over first component 27c from providing the functionality in a first stage to providing the functionality in a second stage.

The at least partial shifting 103 of the functionality of first component 27c to one or multiple other components of the plurality of components 27a, b, d through f may include the one or multiple other components of the plurality of components 27a, b, d through f at least temporarily taking over a task (or portions thereof) of first component 27c. In some examples, the functionality of first component 27c may be completely shifted to the one or multiple other components of the plurality of components 27a, b, d through f (i.e., first component 27c no longer takes part in providing the functionality, and the functionality is completely provided by other components 27a, b, d through f).

In the techniques of the present disclosure, the vehicle electrical system is designed to likewise carry out the changing of the functionality and the at least partial shifting in the event of the violation of one or multiple operating state-related criteria of first component 27c and/or of vehicle 20. An operating state-related criterion may establish whether and/or to what extent first component 27c and/or vehicle 20 are/is operating according to a predetermined specification (i.e., if the operating state-related criterion is violated, first component 27c and/or vehicle 20 do(es) not operate according to the predetermined specification). In some examples, a check of the operating state-related criterion may include evaluating one or multiple state parameters of vehicle 20 and/or of its components and/or of its surroundings (which are generated, for example, by monitoring vehicle 20 and/or its components and/or its surroundings). A check of the operating state-related criterion may include, for example, a check of whether vehicle and/or its components is/are operating normally or whether anomalies are occurring (for example, whether a driving maneuver is carried out as specified). Additionally or alternatively, a check of the operating state-related criterion may include, for example, a check of whether one or multiple state parameters of vehicle 20, of the surroundings of vehicle 20, and/or of the components of vehicle 20 are in a predetermined range (for example, whether a temperature of a component or a visual range of a sensor is within a certain range). Thus, the changing of the functionality and the at least partial shifting may be carried out in the techniques of the present disclosure after a manipulation of the software is recognized (i.e., an intrusion), and also when certain operating states of the vehicle are present (for example, operation of vehicle 20 and/or its components outside a predetermined specification).

In some examples, the one or multiple operating state-related criteria may be operating safety criteria (operating safety is also referred to as "functional safety" or "safety") of first component 27c and/or of vehicle 20. The operating safety criteria and their checking may be carried out as described above. For example, an operating safety criterion may establish whether and/or to what extent first component 27c and/or vehicle are/is operating according to a predetermined (safety) specification (i.e., if an operating safety criterion is violated, first component 27c and/or vehicle 20 do(es) not operate according to the predetermined (safety) specification and are/is thus deemed as unsafe). In the case of functionalities that are critical for operating safety (for example, functionalities that concern driving maneuvers), it may be more likely that the vehicle electrical system provides an at least partial shifting of the functionality anyway (i.e., the vehicle electrical system has an at least partially redundant design with regard to the functionality). However, the techniques of the present disclosure are not limited to functionalities that are critical for operating safety. Thus, an option for at least partially shifting the functionality to some other component (for an air conditioning or infotainment functionality, for example) may also be provided for functionalities that are not critical for operating safety.

In some examples, central device 25 for mitigating a manipulation may orchestrate the at least partial shifting of the functionality of first component 27c to the one or multiple other components 27a, b, d through $f$ (i.e., central device 25 for mitigating a manipulation initiates the steps of shifting and/or possibly instructs other components to do so). For this purpose, central device 25 for mitigating a manipulation may instruct the one or multiple other components 27a, b, d through $f$ to at least partially take over the functionality of first component 27c. In some examples, the orchestration may include ensuring that the functionality in vehicle 20 is provided in accordance with a current requirement profile (i.e., according to a predetermined specification in the particular state of the vehicle and/or its surroundings). In some examples, this may include ensuring that the functionality in vehicle 20 is provided by a component. Additionally or alternatively, the orchestration may include ensuring that a certain functionality is not (simultaneously) provided by multiple components (which could possibly result in "overfulfilling" a requirement profile, and thus, likewise result in faulty behavior). In some situations, using central device 25 for mitigating a manipulation for orchestrating the at least partial shifting of the functionality of first component 27c to the one or multiple other components 27a, b, d through $f$ may prevent an intruder, by manipulating the software of first component 27c, from also crippling the countermeasure according to the techniques of the present disclosure.

In some examples, the communication for at least partially shifting the functionality of first component 27c to the one or multiple other components of the plurality of components 27a, b, d through $f$ may be secured using one or multiple cryptographic methods. In some examples, the communication may take place between first component 27c and central device 25 for mitigating a manipulation, and/or between central device 25 for mitigating a manipulation and the one or multiple other components of the plurality of components 27a, b, d through $f$. For example, the communication may take place with encryption. Additionally or alternatively, the communication may take place using digital signatures (in order to authenticate the users, for example a source of a request for activating and/or deactivating the write lock). Additionally or alternatively, the communication may also be concealed in a data stream of the vehicle with the aid of an obfuscation method. Additionally or alternatively, the communication may also be secured via a time stamp which may be evaluated for checking the communication from the users of the communication (for example, the users of the communication discard messages that are older than a predetermined threshold age). In some examples, security modules of first component 27c, of central device 25 for mitigating a manipulation, and/or of the one or multiple other components of the plurality of components 27a, b, d through $f$ may be used for carrying out the one or multiple cryptographic methods (for first component 27c, possibly even further modules may be used for carrying out the one or multiple cryptographic methods; further discussions concerning the security module are provided below in conjunction with FIG. 3).

Figure 3:
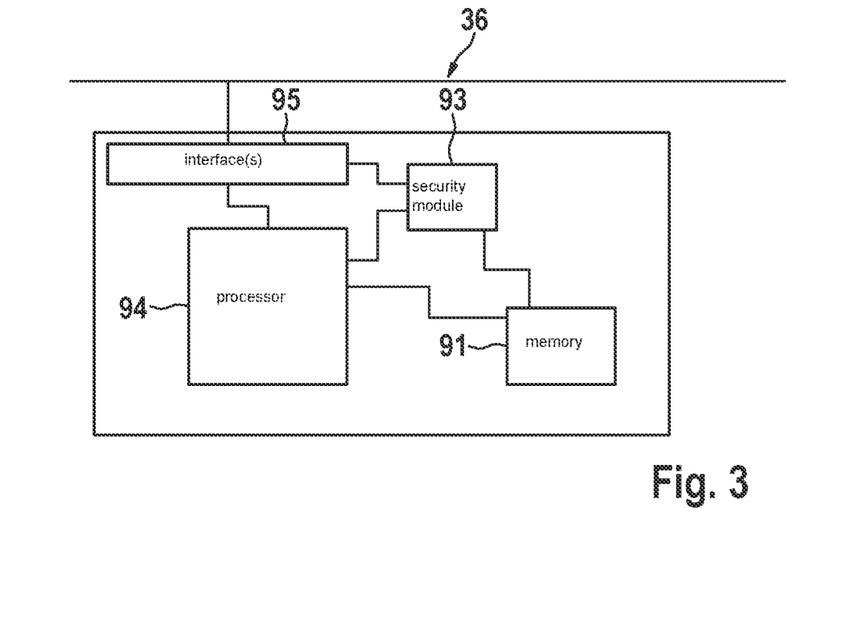
FIG. 3 shows an example of a component of a vehicle electrical system.

With reference to FIG. 3, aspects of first component 27c are now further explained (the other components of the present disclosure may likewise have the described design). First component 27c includes a memory 91. Memory 91 may be a nonvolatile memory, for example (an EPROM memory or a flash memory, for example). Memory 91 may be designed to store at least one software component for first component 27c (for example, for controlling first component 27c). Memory 91 may be a program memory of first component 27c. Memory 91 may encompass only a portion of the total memory of first component 27c. Alternatively or additionally, memory 91 may be distributed over multiple hardware modules and/or logical segments.

First component 27c may include a security module 93. With regard to its hardware and/or software, security module 93 may be separate from the remaining modules of first component 27c (i.e., may be a separate physical module or an independent peripheral module). The security module may include one or multiple dedicated processors (for example, at least one crypto accelerator). In other examples, security module 93 may include one or multiple cores of a multicore processor or other elements of a higher-order component (that are statically or dynamically allocated to the security module; for example, one or multiple cores of a multicore processor may be configured to form the security module). In this case as well, the security module (for example, one or multiple cores of the multicore processor) is separated from the other elements (for example, the circuits are physically separate). In some examples, security module 93 may be designed to carry out one or multiple cryptographic functions (for example, changing and/or shifting the functionality) in addition to the functions described in the present disclosure (for example, one or multiple functions of managing cryptographic keys and/or signatures, encrypting or decrypting data and other cryptographic functions). Additionally or alternatively, security module 93 may include a (manipulation) detection device for recognizing a manipulation (as described in greater detail below). In some examples, security module 93 is a hardware security module (HSM). In the example in FIG. 3, security module 93 is an internal security module of component 27c. In other examples, the security module may be an external security module for component 27c (which is contained, for example, in some other component of vehicle 20, for example, in a central device 25 for mitigating a manipulation of software).

In some examples, changing the functionality of first component 27c may be carried out by security module 93 of first component 27c. For example, the security module may send commands (to a processor of first component 27c, for example), for changing the functionality of the first component (for example, switching off at least a portion of the first component). Security module 93 may be configured to force the changing of the functionality (for example, to match other modules of first component 27c). In some cases, the situation that a manipulation of the software of first component 27c by an intruder also thwarts carrying out the countermeasure of changing the functionality of first component 27c may be prevented in this way. Manipulating security module 93 may be (significantly) more difficult than manipulating the other modules of the first component. In addition, the described increase in security may in some cases be achieved without appreciable modification of the hardware of the component, since a security module that is already present is used twice.

In some examples, the at least partial shifting of the functionality of first component 27c to the one or multiple other components 27a, b, d through f may be orchestrated by security module 93 (and not, as described above, by central device 25 for mitigating a manipulation of software). For this purpose, security module 93 may send appropriate instructions to the one or multiple other components 27a, b, d through f and/or other components of the vehicle electrical system.

Component 27c also contains a processor 94 (for example, as part of a head unit) for executing commands. As mentioned above, the term "processor" also encompasses multicore processors or multiple separate elements that take over the tasks of a central processing unit of an electronic device (and optionally share same). In some examples, component 27c may include one or multiple interfaces 95 that are designed for communication via a transmission path 96 of the vehicle electrical system. As is apparent in FIG. 3, processor 94, security module 93, or both may directly access the one or multiple interfaces 95 in order to communicate via transmission path 96 of the vehicle electrical system (when the security module orchestrates the shifting of the functionality, a direct access to the one or multiple interfaces 95 may be advantageous). The transmission path may be a transmission path of a bus system (CAN, LIN, MOST, FlexRay, or Ethernet, for example).

An example of a sequence of a method of the present disclosure is discussed below with reference to FIG. 4.

Figure 4:
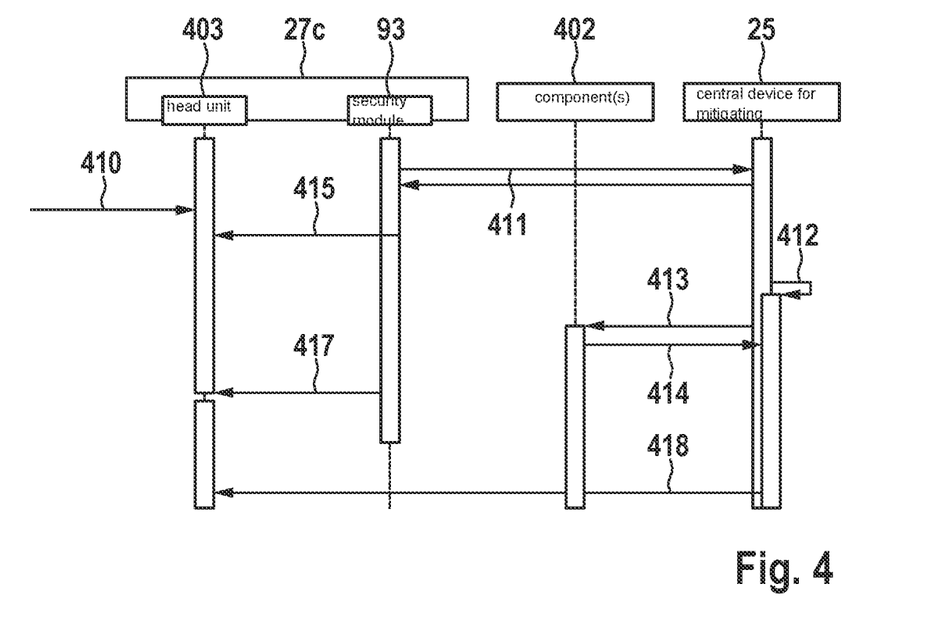
FIG. 4 shows a flowchart of an example of a method of the present invention.

Each column in FIG. 4 shows the actions of a certain component (or of one of its modules) or system. Arrows between the columns symbolize communication between the particular units. A certain component (first component 27c of the present disclosure) is shown at the far left (for example, an embedded system of vehicle 20, for example a control unit). Component 27c may include two modules: a head unit 403 (which may contain a processor 94, for example) and a security module 93. Head unit 403 may be designed to provide a functionality of the component in the vehicle (for example, measuring tasks, monitoring tasks, control tasks, communication tasks, and/or other work tasks). One of other components 402 of the vehicle electrical system (to which the functionality of first component 27c is shifted) is shown in the middle column. The operations of a central device for mitigating a manipulation of software are shown at the far right.

As shown in FIG. 4, at a certain point in time a manipulation 410 of the software of first component 27c (or of head unit 403) may now take place. The manipulation may be detected 415 by security module 93 of first component 27c. Security module 93 may subsequently change the functionality of first component 27c. For example, head unit 403 may be deactivated 417. Alternatively or additionally, security module 93 may transfer head unit 403 into a state in which the manipulated software may be reset (for example, a reprogramming mode). First component 27c now is no longer able (or is able only to a limited extent) to provide the functionality.

In addition, it may be communicated to central device 25 for mitigating a manipulation of software that a manipulation has been detected. In the example from FIG. 4, this happens in that a signal 411, which otherwise is (routinely) sent from first component 27c (and optionally also from central device 25 for mitigating a manipulation of software), is not sent at the proper point in time. Central device 25 for mitigating a manipulation of software may recognize 412 the absence of signal 411 and thus the possibility of a manipulation of the software of first component 27c. Central device 25 for mitigating a manipulation of software may subsequently orchestrate the shifting of the functionality to other component 402. For example, an instruction to transfer functionality 413 to other component 402 may be sent. The other component may then provide the functionality (and optionally send an acknowledgment 414 to central device 25 for mitigating a manipulation of software).

FIG. 4 shows that the changing of the functionality of first component 27c is ended after the shifting of the functionality to other component 402. In other examples, both actions may be carried out in reverse order or concurrently (for example, within one second).

In any case, after carrying out the changing and the shifting of the functionality, the vehicle may be in a secure state (according to a predetermined safety criterion).

The manipulation may be remedied (for example, by resetting 418 the software of first component 27c, as described in greater detail below).

Aspects of central device 25 for mitigating a manipulation of software are explained in the following paragraphs. Central device 25 for mitigating a manipulation of software is shown in the example from FIG. 2. In some cases, the vehicle may contain only one central device 25 for mitigating a manipulation of software, which is designed to mitigate manipulations of the plurality of components 21 through 24, 27a through f, and in particular to orchestrate the shifting of the functionality of the components (for example, of all components of a vehicle for which a manipulation of software may be remedied, or a subset of these components). In other examples, a vehicle may include multiple central devices for mitigating a manipulation of software, which are part of the vehicle electrical system and in each case are associated with a plurality of the components of the vehicle electrical system (i.e., may remedy manipulations in the software of the associated components). In any case, however, the central devices for mitigating a manipulation of software are separated from the associated components. In some cases, central device 25 for mitigating a manipulation of software may also be designed to mitigate a manipulation of its own software and/or of the software of a component into which central device 25 for mitigating a manipulation of software is integrated.

Figure 2:
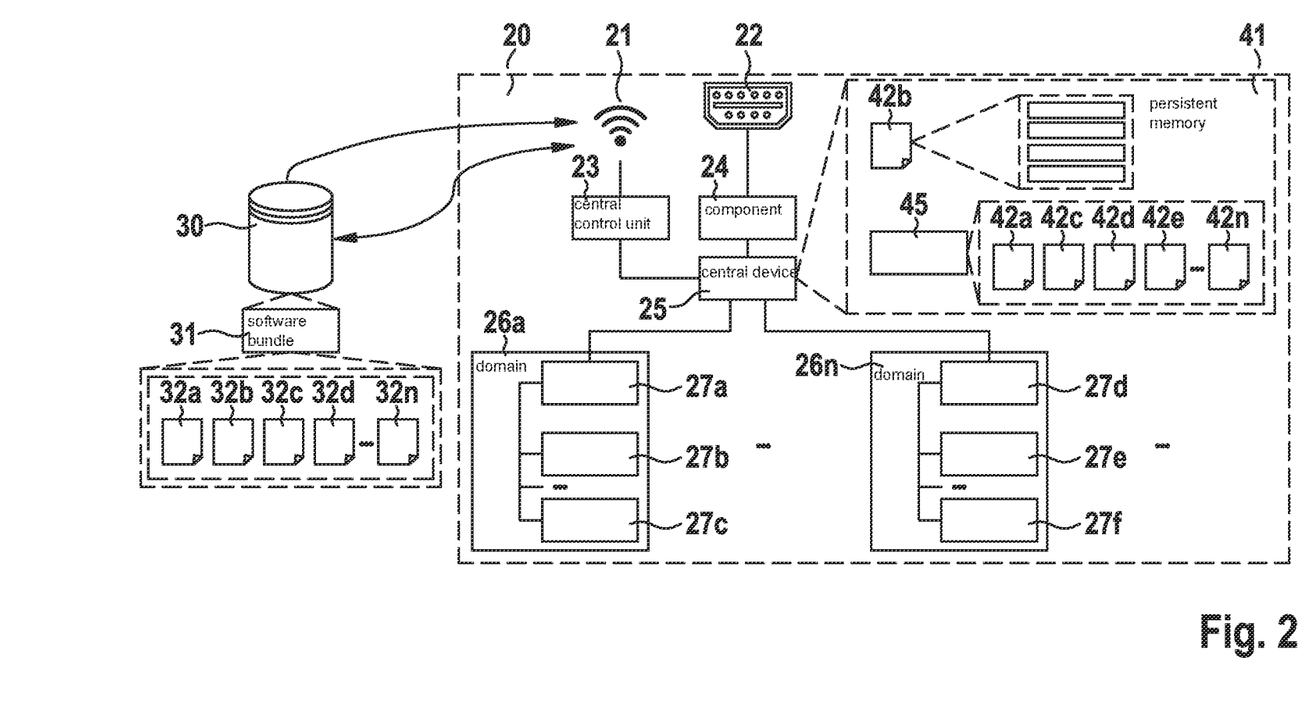
FIG. 2 shows components of a vehicle electrical system of a vehicle in which the techniques of the present invention may be used.

In the example from FIG. 2, a plurality of components, for which manipulations of their software may be remedied using the techniques of the present disclosure, include a plurality of control units 27a through f. As described above, the techniques of the present disclosure are not limited to control units, but, rather, are usable in principle for any component of a vehicle electrical system of vehicle 20. However, since control units 27a through f in vehicles generally have only limited hardware resources and/or functionalities, in some cases the techniques of the present disclosure may be particularly advantageous for control units.

Control units 27a through f are subdivided into multiple domains 26a through n in FIG. 2. The domains may be functional and/or local domains of vehicle 20. A functional domain may include various components of a vehicle that take part in providing a certain function of the vehicle (for example, engine control, control of the drive train, infotainment, air conditioning, etc.). A local domain may include various components of a vehicle that are physically situated in a certain area of the vehicle (for example, "right rear," "left front," "interior front," etc.).

A domain 26a through n may in turn contain a component 27a, 27d that functions as a central communication node for particular domain 26a through n and/or takes over control functions for particular domain 26a through n. In some examples, a central device for mitigating a manipulation of software may be part of component 27a, 27d that functions as a central communication node for particular domain 26a through n, and/or takes over control functions for particular domain 26a through n. This central device for mitigating a manipulation of software may be provided in addition to further central devices for mitigating a manipulation of software (for example, a central device for mitigating a manipulation of software as part of a central communication interface of the vehicle electrical system), or as a single central device for mitigating a manipulation of software (see above explanations). Alternatively or additionally, a central device for mitigating a manipulation of software may also be designed as part of a central control unit 23 of the vehicle. Alternatively or additionally, a central device for mitigating a manipulation of software may also be provided as part of a head unit of an infotainment system of vehicle 20 (not shown in FIG. 2). Alternatively or additionally, a central device for mitigating a manipulation of software may also be provided as part of a central computer (vehicle computer) of the vehicle electrical system (the vehicle electrical system may contain a plurality of central computers (vehicle computers)). A central computer (vehicle computer) may have (significantly) higher performance than dedicated control units of the vehicle electrical system, and may take over the tasks of multiple control units (possibly in multiple of the above-mentioned domains).

In addition, vehicle 20 may include a central persistent memory 41 (i.e., a memory that stores its information in the vehicle for a long period of time, for example longer than a day or longer than a week and/or during an idle state of the vehicle). In some examples, persistent memory 41 may include a flash memory. In the example from FIG. 2, persistent memory 41 is situated in the central communication interface of vehicle 20 or is directly connected to same. As discussed, central device 25 for mitigating a manipulation of software may likewise be situated in the central communication interface of vehicle 20. Even if a central device for mitigating a manipulation of software is (additionally or alternatively) situated in another component, a persistent memory may additionally or alternatively be situated in the same component. In this way, data that are stored in the persistent memory by the central device for mitigating a manipulation of software may be used for mitigating manipulations. However, in other examples, a central device for mitigating a manipulation of software and a persistent memory may also be situated in different components of the vehicle electrical system (and the central device for mitigating a manipulation of software may access the persistent memory via the network).

Persistent memory 41 may be designed to simultaneously store software components 42a, 42c through n for each component of the plurality of components 27a through f. For this purpose, persistent memory 41 may be designed with a memory capacity of greater than 256 MB (preferably greater than 5 GB).

The countermeasure against the manipulation, in addition to the changing and shifting of the functionality, may include resetting of the software of a component for which a manipulation of its software has been recognized (also referred to as "first component" in the present disclosure), for example, using software components 42a, 42c through n for the particular component stored in central persistent memory 41. Further aspects of this further countermeasure are discussed in greater detail below with reference to FIGS. 5 and 6.

In some examples, software components 42a, 42c through n that are contained in central persistent memory 41 may be based on software update information 32a, 32c through n for each component of the plurality of components 27a through n (for example, generated from software update information 32a, 32c through n or corresponding to same).

Software update information 32a, 32c through n may be received via an interface 21 of vehicle 20. Interface 21 may be a wireless interface (as shown in FIG. 2), but in other examples may also be a wired interface 22 (for example, an interface to the on-board diagnostics). The vehicle may be designed to receive software update information 32a, 32c through n from remote system 30 via one of interfaces 21, 22. As shown in FIG. 1, remote system 30 may select 107 software update information 32a, 32c through n for the vehicle in question and send it to vehicle 20 via one of interfaces 21, 22. Remote system 30 may be any arbitrary system that is suitable for providing software update information 32a, 32c through n (for example, a cloud memory and/or a distributed system). In addition to providing software update information 32a, 32c through n, remote system 30 may take over further functions during operation of the vehicle (for example, monitoring and/or control functions for vehicle 20).

In some examples, software update information 32a, 32c through n for a plurality of components (for example, control units 27a, c through n) is contained in a software bundle or software container 31 (i.e., the software update information is provided bundled). The software bundle or software container 31 (often having a significant size) is transmitted to vehicle 20 at a certain point in time. As described, transmitted software update information 32a, 32c through n for updating the software of the plurality of components 27a through f is used in vehicle 20. For this purpose, software update information 32a, 32c through n obtained from remote system 30 may run through one or multiple preparatory steps (for example, unpacking, verifying a signature, etc.). Additionally or alternatively, the software update information may eliminate a weak point in the vehicle electrical system of the vehicle.

Additionally or alternatively, software update information 32a, 32c through n (for example, in a software bundle or software container) may be received via a wired interface 22.

Before or after any preparatory steps, software update information 32a, 32c through n may be stored in persistent memory 41 as software components 42a, 42c through n for the plurality of components 27a, c through n (for example, before it is used for updating the software of components 27a, c through n). Stored software components 42a, 42c through n for the plurality of components 27a, c through n are then available to central device 25 for mitigating a manipulation of software for mitigating a manipulation in the plurality of components 27a, c through n. This mitigation may take place after the updating of the software of each component of the plurality of components 27a, c through n is completed (for example, in a time period up to receipt of further software update information 32a, 32c through n).

In some examples, the techniques of the present disclosure may thus be used in components that are already present in the vehicle, for example, a persistent memory 41 that is used in an update process of the software of vehicle 20. In some cases, this may result in a significant saving of components (as described above, the memory required for storing a software bundle or software container 31 with software update information 32a, 32c through n may assume a significant size). Additionally or alternatively, providing the individual components with additional resources (memory, for example) may be avoided, which may likewise reduce the complexity and thus the susceptibility to errors and/or costs. Additionally or alternatively, in many situations the information in persistent memory 41 may also be available quickly, and independently of the usability of a communication channel of the vehicle. This may increase the response time of the method for mitigating a manipulation.

In the techniques of the present disclosure, the countermeasure for mitigating may be carried out essentially without the use of systems outside vehicle 20 (for example, remote system 30). For example, the countermeasure may be initiated by central device for mitigating a manipulation of software, without the need for communication with systems outside vehicle 20 (during this operation, vehicle 20 may in fact communicate with a system outside vehicle 20 for other purposes). Additionally or alternatively, central device 25 for mitigating a manipulation of software (or some other component of the vehicle electrical system) may carry out a countermeasure without the need for communication with systems outside vehicle 20.

In some examples, the techniques of the present disclosure may include selecting a further countermeasure (in addition to the changing and shifting of the functionality, referred to below only as "further countermeasure") among a plurality of further countermeasures, based on context information for the vehicle. The context information may include information concerning an operating state of vehicle 20 and/or concerning predetermined rules for operating vehicle 20.

An operating state may be a driving state of the vehicle (for example, fast driving, slow driving, carrying out certain driving maneuvers, etc.), but also an operating state during which the vehicle is not traveling. Alternatively or additionally, the context information for vehicle 20 may include surroundings information and/or state information of the components of the vehicle.

The rules for operating vehicle 20 may contain predetermined safety criteria (which in turn may be a function of operating states of vehicle 20 and which establish, for example, when and with which dependencies a further countermeasure for a certain component is allowed to be initiated).

The context information may be at least partially stored in a memory of central device 25 for mitigating a manipulation of software (for example, central persistent memory 41) for use in selecting a further countermeasure (in particular the portion of the context information that includes information concerning predetermined rules for operating vehicle 20). In some examples, the context information may be updated from outside vehicle 20 (for example, as part of software update information 32b for central device 25 for mitigating a manipulation of software or a component in which central device 25 for mitigating a manipulation of software is situated).

In some examples, various further countermeasures may be available for mitigating certain manipulations of the software of components 27a, c through n (the possible further countermeasures are described in greater detail below). The context information may now be used to select one of the available further countermeasures. In some examples, among multiple available further countermeasures, the countermeasure that allows the greatest possible restoration of a setpoint state of the component may be selected (i.e., that remedies the manipulation to the greatest possible extent). On the other hand, available further countermeasures may be excluded in some situations, based on rules contained in the context information (for example, when a certain safety criterion has been violated).

For example, a first further countermeasure, although it allows a more extensive mitigation of the manipulation than a second further countermeasure, on the other hand may require a more in-depth intervention into the components of the vehicle (and thus, a greater risk for disturbances that may be caused by the mitigation process itself). A second further countermeasure, although it allows a less extensive mitigation of the manipulation compared to the first further countermeasure, on the other hand may require a less in-depth intervention into the components of the vehicle. In this case, the first further countermeasure may be selected in a first context (expressed by the context information), and the second further countermeasure may be selected in a second context (expressed by the context information). In one illustrative example, the first context may be a context in which the vehicle is traveling fast, and the second context may be a context in which the vehicle is stationary. In other cases, the context information may include a safety criterion whose fulfillment prohibits carrying out the first further countermeasure in a first situation, but allows it in a second situation.

In some examples, the further countermeasures may include an immediate (for example, within five minutes or within one minute) resetting of the software of first component 27a, c through f, using software component 42a, c through n that is stored in central persistent memory 41 (for example, generated based on the received software update information) for component 27a, c through f for which a manipulation has been recognized, and a later resetting of the software of component 27a, c through f, using software components 42a, c through n for particular component 27a, c through f. In turn, the immediate resetting may be ruled out in certain contexts (for example, due to safety criteria). For example, the later resetting may take place in a time period up to the next boot-up process of particular component 27a, c through f.

Figure 5:
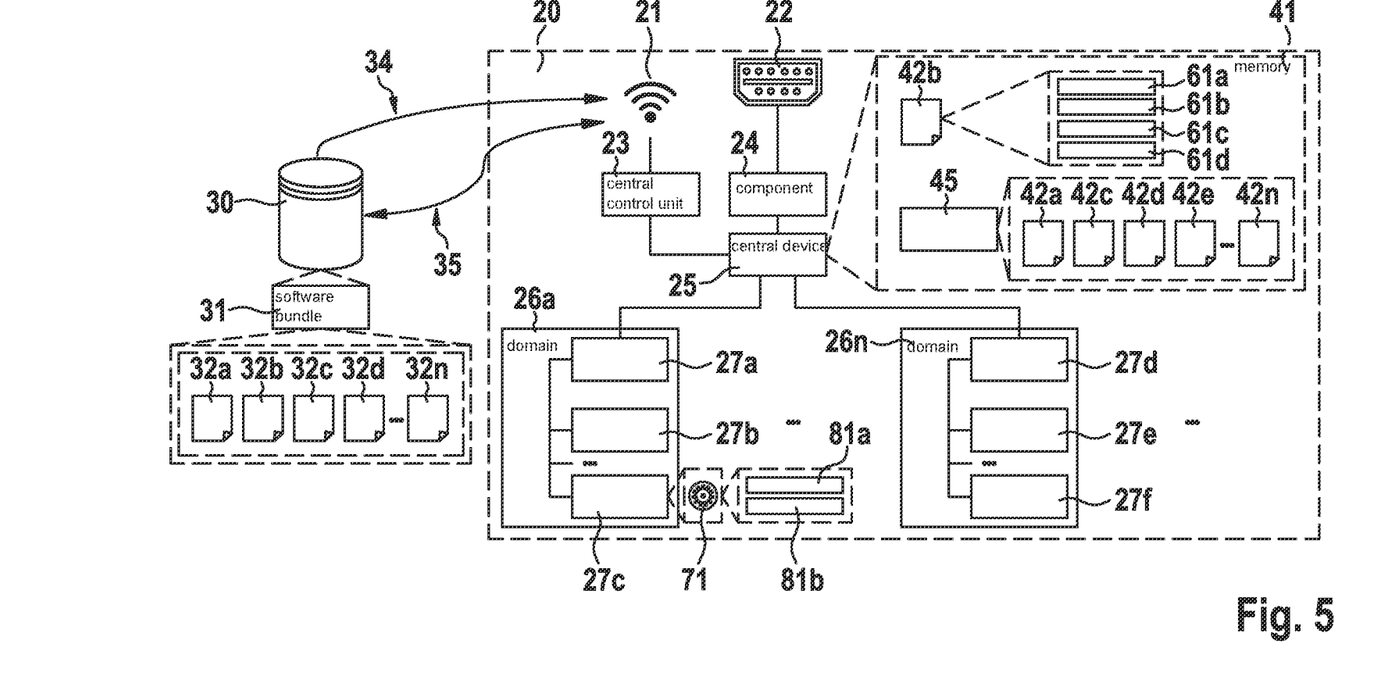
FIG. 5 shows the vehicle electrical system according to FIG. 2 in which a first component has been manipulated.
Figure 6:
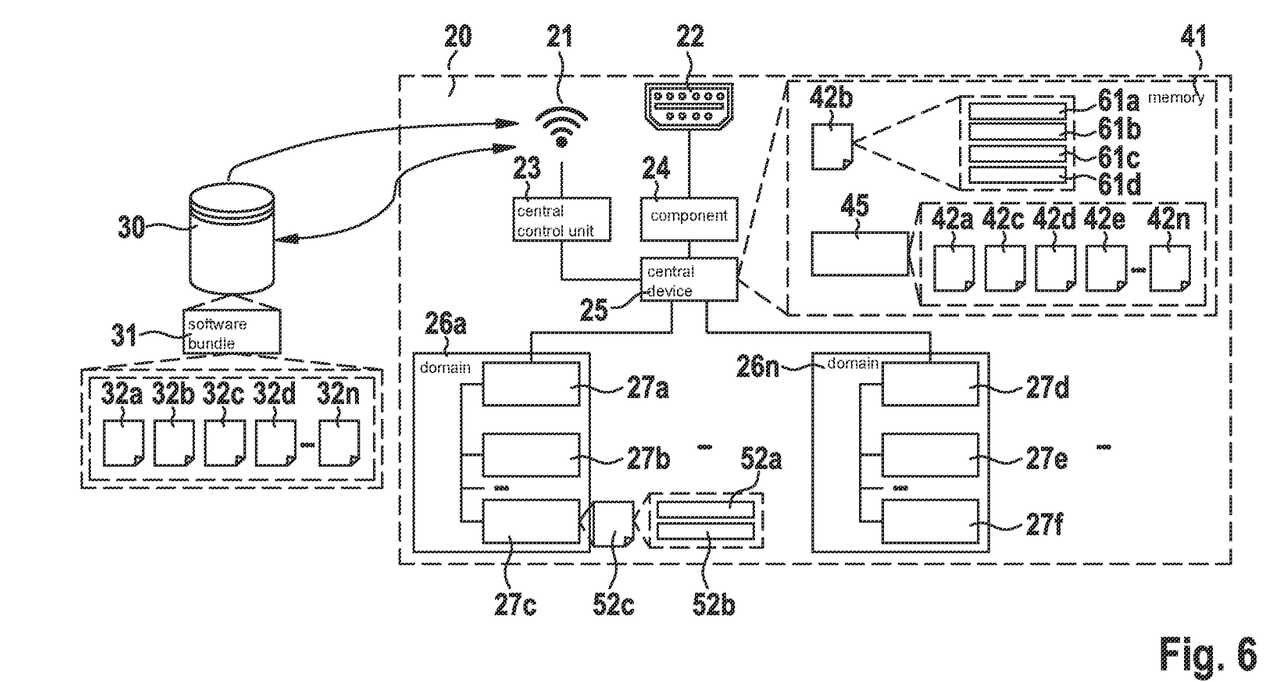
FIG. 6 shows the vehicle electrical system according to FIG. 2 in which the manipulation of the first component has been remedied.

Further aspects of the techniques of the present disclosure are explained below with reference to FIGS. 5 and 6. FIG. 5 shows the vehicle electrical system according to FIG. 2, in which a first component 27c has been manipulated. FIG. 6 shows the vehicle electrical system according to FIG. 2, in which the manipulation of first component 27c has been remedied.

Several aspects of the detection of the manipulation of the software of a component 27a, c through f of vehicle 20 are initially explained in greater detail. As mentioned above, the techniques of the present disclosure may involve recognizing a possibility of a manipulation of the software of a component of a plurality of components of a vehicle electrical system, which in some examples involves reception of a signal. This signal may be generated in various ways.

A manipulation of software of a component 27a, c through f may be initially detected. This detection may take place locally using appropriate (manipulation) detection devices of the component in question.

In FIG. 5, the software of one of control units 27c (the "first component" in some examples of the present disclosure) has been manipulated. A manipulated software component 71 has been introduced.

A (manipulation) detection device 81a of control unit 27c may recognize this manipulation and may generate an appropriate signal for central device 25 for mitigating a manipulation of software (also see steps 111 and 113 in FIG. 1). This signal may then be processed as discussed above in order to initiate and carry out a mitigation.

In other examples or in addition, a (manipulation) detection device 61b of the central communication interface of vehicle 20 may (remotely) detect the manipulation of control unit 27c and may generate the signal for central device 25 for mitigating a manipulation of software (which in the example from FIG. 3 is likewise situated in the central communication interface of vehicle 20). In some examples, central device 25 for mitigating a manipulation of software is thus also designed for a central detection of the manipulation of the software of a plurality of components 27a, c through f of the vehicle electrical system.

In other examples or in addition, a detection device of remote system 30 may (remotely) detect the manipulation of control unit 27c and may generate the signal for central device 25 for mitigating a manipulation of software. In this example, the signal may be received via an interface of the vehicle. However, if the detection of the manipulation also takes place within the vehicle, a time period up to the mitigation of the manipulation may be shortened in some cases.

The various detection devices 81a, 61b (in particular detection devices 81a, 61b situated in the vehicle) may be detection devices that are already present in the (vehicle electrical system) network. As described above, manipulations of the software may also be recognized in some conventional methods.

The detection of the manipulation may take place in any possible manner. For example, software may be checked upon start-up (secure boot) and/or during operation (run-time manipulation detection) with the aid of one or multiple methods for checking the authenticity and/or genuineness of the software (for example, using one or multiple digital signatures).

In other examples, a signal for which the possibility of the manipulation is recognized if the signal is absent may be generated by the components described above. For example, a (manipulation) detection device 81a of control unit 27c may generate a signal (for example, routinely or when certain events occur), whose absence may indicate a manipulation of the software of control unit 27c.

Further aspects of the further countermeasure of resetting the software of first component 27c, using a software component 42c for first component 27c that is stored in central persistent memory 41, are now discussed with reference to FIGS. 5 and 6.

Central device 25 for mitigating a manipulation may select a further countermeasure based on a detection of the manipulation of first component 27c. In the example from FIGS. 5 and 6, a resetting of the software of first component 27c is selected as the further countermeasure. The resetting may encompass bringing the software to a last authenticated state. This may include deleting and/or overwriting all or part of the software of first component 27c (for example, a control unit). The deleting and/or overwriting of all or part of the software of first component 27c may be carried out remotely (i.e., via a connection of the vehicle electrical system) by central device 25 for mitigating a manipulation. In this way, manipulated software component 71 or portions 81a, 81b thereof may be replaced by an authentic (i.e., unmanipulated) software component 52c or portions 53a, 53b thereof in order to remedy the manipulation.

Authentic (i.e., unmanipulated) software 52c may be retrieved from persistent memory 41. As mentioned above, persistent memory 41 may store software component 42c in a directly usable form, or in a form that can be used only after one or multiple processing steps for resetting manipulated software component 71 of first component 27c.

In some examples, central device 25 for mitigating a manipulation may carry out measures for ensuring the authenticity of software components 42a, c through n used for resetting the software of the components. For example, an authenticity check may be carried out prior to using a software component 42a, c through n (for example, based on a digital signature or some other security feature). For the authenticity check, central device 25 for mitigating a manipulation may rely on functionalities of the component into which central device 25 for mitigating a manipulation is integrated.

In some examples, persistent memory 41 may contain more than one version of a software component for a certain component of the vehicle electrical system. In this case, central device 25 for mitigating a manipulation may select one of the versions (for example, a present version of the software component).

A countermeasure for mitigating the manipulation of a first component 27c of the vehicle electrical system was discussed above, with reference to FIGS. 5 and 6. However, central device 25 for mitigating a manipulation is configured to initiate countermeasures concerning the manipulation of the software of one or multiple further components of the plurality of components 27a, d through f at some other point in time or concurrently with the mitigation of the manipulation of the software of first component 27c.

In some examples, central device 25 for mitigating a manipulation is designed to recognize the possibility of a manipulation of the software of a further component 27a, d through f of the plurality of components of the vehicle electrical system, and to initiate a further countermeasure for mitigating the manipulation of further component 27a, d through f. The detection of the manipulation, the initiation, and the carrying out of the countermeasures may proceed as described above. For example, a manipulated software component of further component 27a, d through f may be reset.

In this way, a single central device may ensure mitigation of a manipulation of a plurality of components that are remote from it in the vehicle electrical system (for example, control units in various domains), i.e., may remedy manipulations of software of the plurality of components.

A resetting of software of a component has been described above as an example of a further countermeasure that is initiated by the central device for mitigating a manipulation and that is subsequently carried out in the vehicle electrical system.

In some examples, the central device for mitigating a manipulation may alternatively or additionally initiate other further countermeasures that are carried out in the vehicle electrical system.

In some examples, the further countermeasure against the manipulation may include blocking a communication via the vehicle electrical system of first component 27c (whose software is manipulated). Blocking the communication may prevent manipulated software of first component 27c from causing damage via the vehicle electrical system. On the other hand, manipulated software may still carry out a function of first component 27c (for example, for a certain period of time). For this reason, in some cases blocking the communication via the vehicle electrical system of first component 27c may be preferred over resetting the software of first component 27c (for example, in a context in which a failure of first component 27c, at least for the short term, is not tolerable or desirable). The further countermeasure of resetting the software of first component 27c may be initiated and carried out following the further countermeasure of blocking the communication of first component 27c (for example, in an altered context).

Alternatively or additionally, the further countermeasure against the manipulation may include blocking a communication of a group of components via the vehicle electrical system that contains first component 27c. In the example from FIG. 3, first component 27c may be contained in a first domain 26a along with further components 27a, b. Blocking the communication of a group of components via the vehicle electrical system is similar to blocking the individual component, as described above. Here as well, damage from the group of components in the vehicle electrical system may be prevented. Also in the case of blocking the communication of a group of components via the vehicle electrical system, the further countermeasure of resetting the software of first component 27c may be initiated and carried out at a later point in time (for example, in an altered context).

Above, the techniques of the present disclosure have been frequently described with reference to the particular methods. Moreover, the present disclosure relates to a system that is designed to carry out the methods of the present disclosure. The system may include one or multiple components of the vehicle electrical system of the vehicle (for example, may be integrated into same). The vehicle electrical system may also include devices that are only temporarily contained in the vehicle electrical system (for example, a mobile device that is situated in the vehicle and integrated into the vehicle electrical system). In other examples, the system may also encompass a remote system.

Furthermore, the present disclosure relates to a vehicle electrical system for a vehicle that includes at least one central device for mitigating a manipulation of software according to the present disclosure, and a plurality of components of the vehicle electrical system. The vehicle electrical system may be designed to carry out the techniques of the present disclosure (as described above). The vehicle electrical system may also include devices that are only temporarily contained in the vehicle electrical system (for example, a mobile device that is situated in the vehicle and integrated into the vehicle electrical system).

As described above, the central device for mitigating a manipulation of software may be a stand-alone device (i.e., a dedicated module with its own hardware and software resources, which is part of the vehicle electrical system and which may communicate with the other components of the vehicle electrical system). However, in other cases the central device for mitigating a manipulation of software may be integrated into some other (already present) component of the vehicle electrical system. The central device for mitigating a manipulation of software may be designed as a software module (which is incorporated into the software of the component). In other cases, the central device for mitigating a manipulation of software may include at least some dedicated hardware components (while it shares other hardware components of the component into which it is integrated). As likewise mentioned, the other component may be a central communication interface of the vehicle electrical system, a central computer (vehicle computer), or some other component including hardware with comparatively higher performance.

In some examples, an existing component of the vehicle electrical system (for example, a central communication interface of the vehicle or a domain of the vehicle, or a central computer of the vehicle, or a head unit of an infotainment system) may be configured as a central device for mitigating a manipulation of software by updating the software of the component of the vehicle electrical system.

The central device for mitigating a manipulation of software or the other component into which it is integrated may include at least one processor (optionally with multiple cores), and memory that includes commands which, when executed by the processor, carry out the methods of the present disclosure.

Moreover, the present disclosure relates to a vehicle that includes a system according to the present disclosure or that is a part of same, and/or that includes a vehicle electrical system according to the present disclosure.

Furthermore, the present disclosure relates to a computer program that is designed to carry out the methods of the present disclosure.

In addition, the present disclosure relates to a computer-readable medium (for example, a DVD or a solid state memory) that contains a computer program of the present disclosure.

Moreover, the present disclosure relates to a signal (for example, an electromagnetic signal according to a wireless or wired communication protocol) that encodes a computer program of the present disclosure.

What is claimed is:

1. A computer-implemented method, the method comprising the following steps:
   recognizing a possibility of a manipulation of the software of a first component of a plurality of components of a vehicle electrical system of a vehicle by a central device for mitigating a manipulation of software, the central device configured to mitigate the manipulation being part of the vehicle electrical system, and being configured to mitigate a manipulation of software in each component of the plurality of components of the vehicle electrical system;
   initiating a countermeasure for mitigating the manipulation of the software of the first component; and
   carrying out the countermeasure for mitigating the manipulation of the software of the first component, the countermeasure including changing a functionality of the first component and at least partially shifting the functionality of the first component to one or multiple other components of the plurality of components, the vehicle electrical system being configured to carry out the changing of the functionality and the at least partial shifting, also in the event of violation of one or multiple operating state-related criteria of the first component and/or of the vehicle.

2. The method as recited in claim 1, wherein the one or multiple operating state-related criteria are operating safety criteria of the first component and/or of the vehicle.

3. The method as recited in claim 1, wherein the changing of the functionality of the first component is carried out by a security module of the first component.

4. The method as recited in claim 3, wherein the security module is a hardware security module of the first component.

5. The method as recited in claim 1, wherein the central device for mitigating the manipulation orchestrates the shifting of the functionality of the first component to the one or multiple other components.

6. The method as recited in claim 5, wherein the orchestration includes ensuring that the functionality in the vehicle is provided in accordance with a current requirement profile.

7. The method as recited in claim 1, wherein the changing of the functionality of the first component includes switching off the functionality of the first component or limiting the functionality of the first component.

8. The method as recited in claim 1, wherein a communication for at least partially shifting the functionality of the first component to the one or multiple other components of the plurality of components is secured using one or multiple cryptographic methods.

9. A vehicle electrical system for a vehicle, comprising:
a central device configured to mitigate a manipulation of software; and
a plurality of components of the vehicle electrical system that involve a first component, the vehicle electrical system being configured to:
recognize a possibility of a manipulation of the software of the first component of the plurality of components of the vehicle electrical system by the central device for mitigating a manipulation of software, the central device configured to mitigate the manipulation being part of the vehicle electrical system, and being configured to mitigate a manipulation of software in each component of the plurality of components of the vehicle electrical system;
initiate a countermeasure for mitigating the manipulation of the software of the first component; and
carry out the countermeasure for mitigating the manipulation of the software of the first component, the countermeasure including changing a functionality of the first component and at least partially shifting the functionality of the first component to one or multiple other components of the plurality of components, the vehicle electrical system being configured to carry out the changing of the functionality and the at least partial shifting, also in the event of violation of one or multiple operating state-related criteria of the first component and/or of the vehicle.

10. A vehicle, comprising:
a vehicle electrical system for a vehicle, including:
a central device configured to mitigate a manipulation of software; and
a plurality of components of the vehicle electrical system that involve a first component, the vehicle electrical system being configured to:
recognize a possibility of a manipulation of the software of the first component of the plurality of components of the vehicle electrical system by the central device for mitigating a manipulation of software, the central device configured to mitigate the manipulation being part of the vehicle electrical system, and being configured to mitigate a manipulation of software in each component of the plurality of components of the vehicle electrical system;
initiate a countermeasure for mitigating the manipulation of the software of the first component; and
carry out the countermeasure for mitigating the manipulation of the software of the first component, the countermeasure including changing a functionality of the first component and at least partially shifting the functionality of the first component to one or multiple other components of the plurality of components, the vehicle electrical system being configured to carry out the changing of the functionality and the at least partial shifting, also in the event of violation of one or multiple operating state-related criteria of the first component and/or of the vehicle.

11. A non-transitory computer-readable medium on which is stored a computer program, which, when executed by a processor, causes the processor to perform the following:
recognizing a possibility of a manipulation of the software of a first component of a plurality of components of a vehicle electrical system of a vehicle by a central device for mitigating a manipulation of software, the central device configured to mitigate the manipulation being part of the vehicle electrical system, and being configured to mitigate a manipulation of software in each component of the plurality of components of the vehicle electrical system;
initiating a countermeasure for mitigating the manipulation of the software of the first component; and
carrying out the countermeasure for mitigating the manipulation of the software of the first component, the countermeasure including changing a functionality of the first component and at least partially shifting the functionality of the first component to one or multiple other components of the plurality of components, the vehicle electrical system being configured to carry out the changing of the functionality and the at least partial shifting, also in the event of violation of one or multiple operating state-related criteria of the first component and/or of the vehicle.

\* \* \* \* \*